United States Patent
Keam et al.

(10) Patent No.: US 7,834,956 B2
(45) Date of Patent: Nov. 16, 2010

(54) PHOTOLUMINESCENT BACKLIGHTING OF AND INFRARED TRANSMISSIVE VISIBLE LIGHT BARRIER FOR LIGHT VALVE

(75) Inventors: Nigel Keam, Redmond, WA (US); Craig Steven Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 12/046,424

(22) Filed: Mar. 11, 2008

(65) Prior Publication Data

US 2009/0231515 A1    Sep. 17, 2009

(51) Int. Cl.
    *G02F 1/1335*    (2006.01)
(52) U.S. Cl. ............................. 349/71; 349/61; 349/68
(58) Field of Classification Search .................. 349/71, 349/61, 68
    See application file for complete search history.

(56) References Cited

U.S. PATENT DOCUMENTS

| | | | |
|---|---|---|---|
| 4,822,144 A * | 4/1989 | Vriens | 349/71 |
| 7,068,333 B2 * | 6/2006 | Ohashi et al. | 349/68 |
| 7,183,704 B2 | 2/2007 | Kim et al. | |
| 7,204,428 B2 | 4/2007 | Wilson | |
| 7,248,310 B2 | 7/2007 | Mueller-Mach et al. | |
| 2006/0274226 A1 * | 12/2006 | Im et al. | 349/71 |
| 2007/0035540 A1 | 2/2007 | Yee | |
| 2007/0046625 A1 | 3/2007 | Yee | |
| 2007/0200970 A1 | 8/2007 | Keam et al. | |
| 2007/0263999 A1 | 11/2007 | Keam | |
| 2008/0074583 A1 * | 3/2008 | Li et al. | 349/71 |

FOREIGN PATENT DOCUMENTS

WO    WO9108508 A1    6/1991

OTHER PUBLICATIONS

Trayner, et al., "Direct view Holographic Autostereoscopic Displays", Proceedings of the Fourth UK VR-SIG, Brunel University, Nov. 1997. pp. 23-31.
"LCD vs. Plasma: A Competitive Comparison", PL Direct, 2003, pp. 1-3.

* cited by examiner

*Primary Examiner*—John Heyman
(74) *Attorney, Agent, or Firm*—Alleman Hall McCoy Russell & Tuttle LLP

(57) ABSTRACT

Various embodiments related to photoluminescent backlighting for a light valve are disclosed herein. One disclosed embodiment comprises a computing device with a light valve having a viewing side and a back side. A photoluminescent material is disposed behind the back side of the light valve, and an excitation light source is positioned to illuminate the photoluminescent material. Photoluminescence from the photoluminescent material backlights the light valve when the excitation light source illuminates the photoluminescent material.

17 Claims, 3 Drawing Sheets

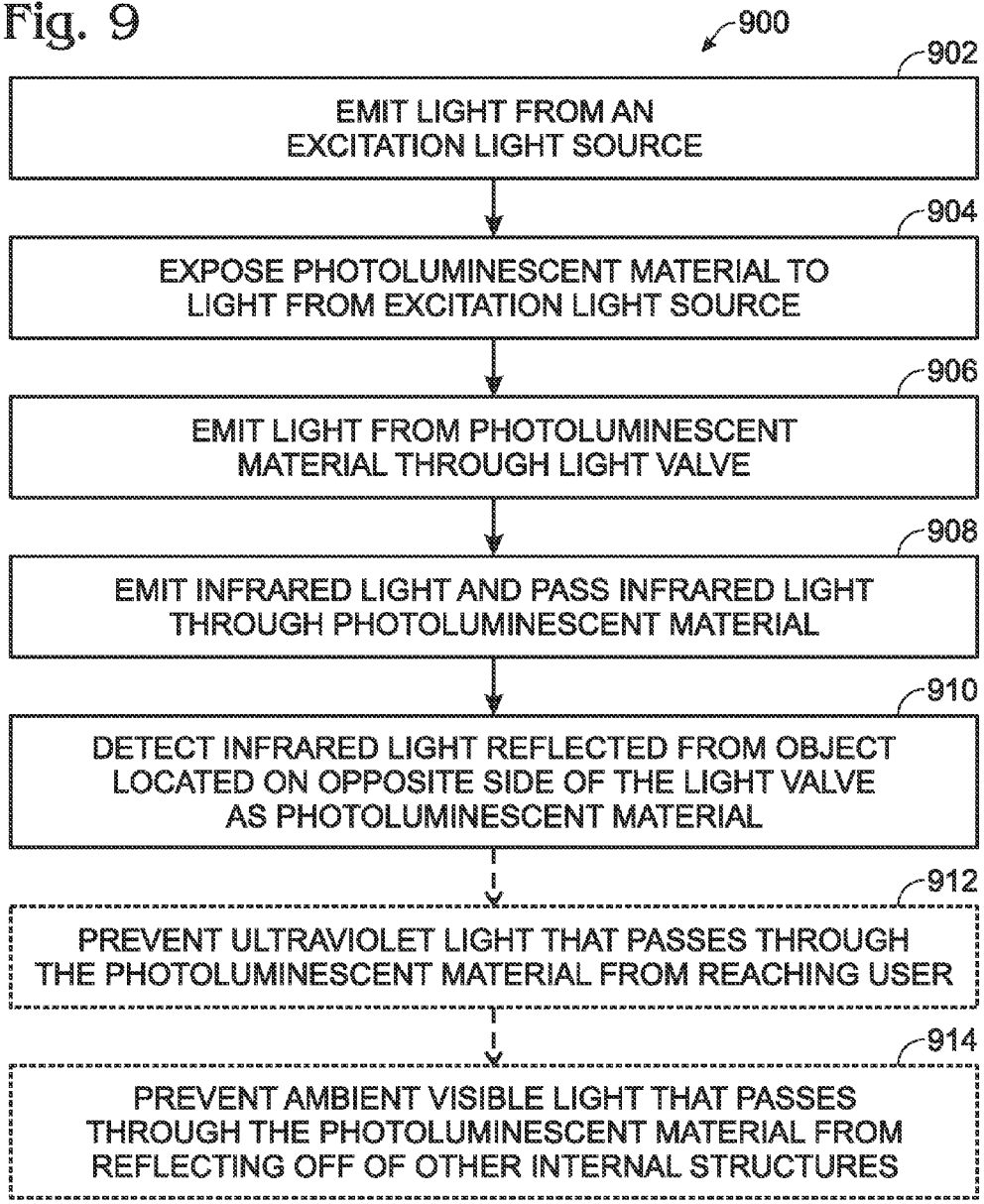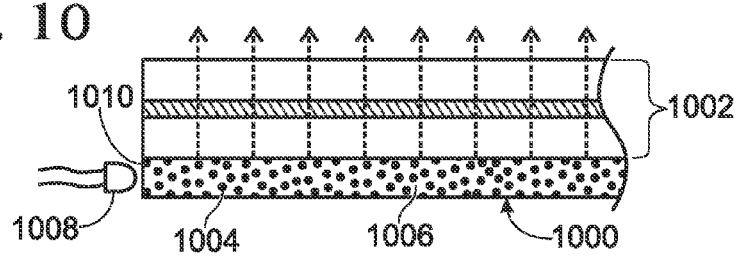

PHOTOLUMINESCENT BACKLIGHTING OF AND INFRARED TRANSMISSIVE VISIBLE LIGHT BARRIER FOR LIGHT VALVE

BACKGROUND

Light valves allow the production of an image via the control of an amount of light reflected by or transmitted through the light valve on a pixel-by-pixel basis. For example, a liquid crystal display utilizes a liquid crystal panel as a transmissive light valve to produce an image by controlling the passage of polarized light through the liquid crystal panel. Color may be produced, for example, by using the liquid crystal panel to selectively pass light through colored filters located in each pixel of the display. White light may be produced by passing light through all colored filters of a pixel, while colored light may be produced by controlling the passage of light through a subset of filters of a pixel.

A backlight or mirror may be used behind the liquid crystal panel (i.e. on an opposite side of the panel as a viewer) to provide a source of light for the liquid crystal panel. Therefore, when a viewer perceives light coming from a liquid crystal display, the viewer is actually looking at whatever is located behind the panel, such as a backlight or mirror. When pixels of a liquid crystal panel are displaying bright light, the panel is largely transparent to visible light at those pixels.

SUMMARY

Various embodiments related to photoluminescent backlighting for a light valve are disclosed herein. For example, one disclosed embodiment comprises a computing device with a light valve having a viewing side and a back side. Further, a photoluminescent material is disposed behind the back side of the light valve, and an excitation light source is positioned to illuminate the photoluminescent material. In this manner, photoluminescence from the photoluminescent material backlights the light valve when the excitation light source illuminates the photoluminescent material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 9 show a process flow depicting an embodiment of a method for backlighting a display via photoluminescence.

FIG. 10 shows another embodiment of a photoluminescent structure utilized with an embodiment of an edge-positioned excitation light source.

DETAILED DESCRIPTION

Figure 1:
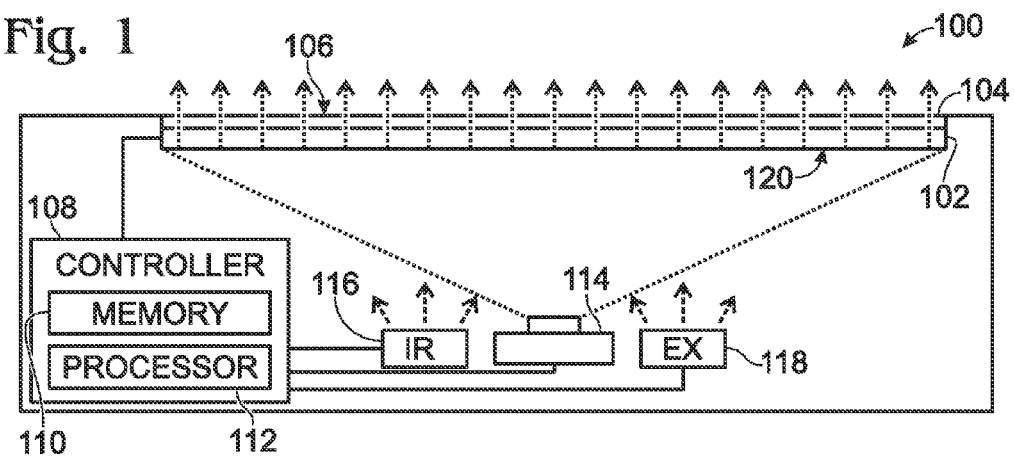
FIG. 1 shows a block diagram of an embodiment of an interactive computing device comprising a light valve backlit via a photoluminescent material.

Before discussing the photoluminescent backlighting of a light valve, an example use environment is described. FIG. 1 shows a schematic depiction of an embodiment of an interactive display device 100 that utilizes a liquid crystal panel 102 backlight via photoluminescence. While described herein in the context of a liquid crystal panel, it will be understood that any other suitable light valve, as well as any other suitable display, may be backlit via photoluminescence as disclosed herein. Suitable light valves include, but are not limited to, light valves that are transparent at one or more non-visible wavelengths, regardless of whether the pixels of the light valve are in a visible light-blocking state or a visible light-transmitting state. Such light valves allow the use of infrared or other non-visible wavelengths to be used to detect objects located on an opposite side of the light valve as an image sensor, as described in more detail below.

The liquid crystal panel 102 and a transparent protective structure 104 together form a display screen 106 on which images may be displayed. The liquid crystal panel 102 is controlled by an electronic controller 108 comprising memory 110 and a microprocessor 112. It will be understood that memory 110 may comprise instructions stored thereon that are executable by the processor 112 to control the various parts of device 100 to effect the methods and processes described herein.

To sense objects placed on display screen 106, the display device 100 comprises an image sensor 114, such as one or more cameras, configured to capture an image of the entire backside of display screen 106, and to provide the image to electronic controller 108 for the detection of objects appearing in the image. This allows the detection of multiple touches from any number of different types of objects on the display screen 106. For example, multiple finger touches by one or more users, as well as multiple touches by other objects such as brushes, styluses, objects with optically readable tags, etc. may be detected and tracked at one time.

The image sensor 114 may be configured to detect light of any suitable wavelength, including but not limited to infrared and visible wavelengths. To assist in detecting objects placed on the display screen 106, the image sensor 114 may further include an illuminant 116 such as one or more light emitting diodes (LEDs) 116 configured to produce infrared light to illuminate a backside of the display screen 106. Many liquid crystal panels are largely transparent to some infrared light regardless of the state of the liquid crystals in each pixel, so objects touching the screen can be viewed no matter the state of the individual pixels of the liquid crystal panel 102.

Light from the illuminant 116 may be reflected by objects placed on display screen 106 and then detected by image sensor 114. The use of infrared LEDs as opposed to visible LEDs may help to avoid washing out the appearance of images projected on the display screen 106. Further, an infrared band pass filter (not shown) may be utilized to pass light of the frequency emitted by the illuminant 116 but prevent light at frequencies outside of the band pass frequencies from reaching the image sensor 114, thereby reducing the amount of ambient light that reaches the image sensor 114.

The image sensor 114 may include any suitable image sensing mechanism. Examples of suitable image sensing mechanisms include but are not limited to one or more CCD and/or CMOS image sensors. Further, the image sensor 114 may capture images of display screen 106 at a sufficient frequency to detect motion of an object across display screen 106. In an alternative embodiment (not shown), an image of the display screen 106 may be obtained by scanning an infrared laser across the backside of the display screen 106. In this embodiment, a simple photodetector may be used to determine whether laser light is reflected or transmitted at each pixel of the display screen 106, thereby building an image of the screen on a pixel-by-pixel basis, allowing the omission of a camera.

As described above, when the liquid crystal panel 102 is displaying bright light, the panel is essentially transparent at those pixels. In many liquid crystal display devices, a backlight is placed directly behind the liquid crystal panel. Because little or no space exists between the liquid crystal panel and the backlight in such devices, all that can be seen by a user is the backlight when the liquid crystal panel is in such a state.

In contrast, interactive display device 100 comprises extra depth to accommodate the image sensor 114. The presence of the image sensor 114 may present difficulties in the placement of a backlight. For example, if a backlight is placed behind the image sensor 114 relative to the display screen 106, then the image sensor 114 will be visible to a user when an image displayed on the liquid crystal panel 102 is bright. Other structures, such as the interior sides of the cabinet or casing of the display device 100, may likewise be visible due to the increased distance between the backlight and the liquid crystal panel. On the other hand, if a backlight is placed in front of the image sensor 114 relative to the display screen, the image sensor's view of the display screen may be obscured.

Accordingly, the interactive display device 100 comprises an excitation light source 118, and a photoluminescent structure 120 configured to absorb light from the excitation light source 118 and to emit visible light through the liquid crystal panel 102, thereby backlighting the liquid crystal panel 102 via photoluminescence. The term "photoluminescence" and the like as used herein describes any photoluminescence process in which light of a shorter wavelength is absorbed and visible light of a longer wavelength is emitted, and may include fluorescence and/or phosphorescence. It will be understood that the excitation light source 118 may emit light of any suitable wavelength, including but not limited to ultraviolet and/or violet wavelengths.

The photoluminescent structure 120 is configured to be transparent to infrared radiation of the wavelength emitted by the illuminant 116 and detected by the image sensor 114, yet to absorb light of the frequency emitted to the excitation light source 118 and to emit visible light having a desired appearance (for example, a white appearance or other desired color). As used herein, the term "white" encompasses any color suitable for use to represent white portions of a displayed image, whether or not the actual color is true white. In this manner, the photoluminescent structure 120 is configured to uniformly backlight the liquid crystal panel 102 in a manner that does not cause interference with the detection of objects on the display screen 106 via infrared light. Because light emitted by the photoluminescent structure 120 is emitted in random directions, the photoluminescent structure 120 may provide a uniform lambertian light source for the liquid crystal panel 102.

Any suitable type of light source may be used as excitation light source 118. Examples include, but are not limited to, a violet or ultraviolet tube, a violet or ultraviolet laser, a violet or ultraviolet light-emitting diode, and/or combinations thereof.

The photoluminescent structure 120 may include different photoluminescent materials that output different wavelengths of light that can be mixed to form white light. In this manner, a substantially white photoluminescent backlight may be produced for the display screen 106. In other embodiments, the photoluminescent structure 120 may be configured to produce light of a color other than white.

Figure 2:
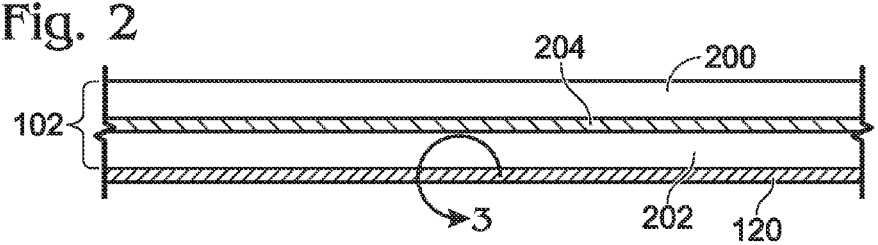
FIG. 2 shows a schematic view of the liquid crystal panel of the embodiment of FIG. 1.

The photoluminescent structure 120 may be supported directly by the liquid crystal panel 102 such that the photoluminescent structure forms part of the liquid crystal panel 102, or may be provided as a separate component that is positioned just behind the liquid crystal panel 102. FIG. 2 shows an example of a photoluminescent structure 120 supported by the liquid crystal panel 102. In this figure, the liquid crystal panel comprises a front side 200 configured to face a viewer of the panel, a back side 202 opposite the front side 200, and a liquid crystal layer 204 disposed between the front side 200 and the back side 202. The front side 200 and back side 202 are shown generically, and may include structures such as polarizing filters, liquid crystal-aligning panels, transistors, electrodes, etc., that are not shown in this figure. The photoluminescent structure is shown coupled to the back side 202 of the liquid crystal panel 102 such that no open space exists between the structures.

Figure 3:
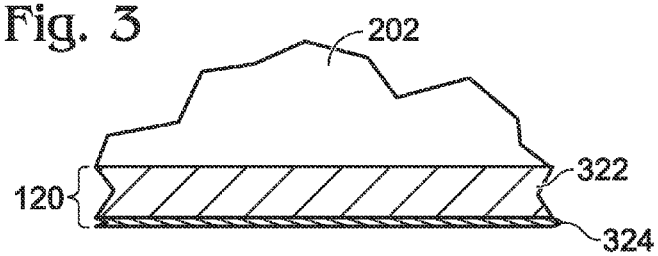
FIG. 3 shows a magnified view of a portion of the embodiment of FIG. 2, illustrating an embodiment of a photoluminescent structure.

The photoluminescent structure 120 is disposed behind the back side 202 of the liquid crystal panel 102 to provide backlighting for the liquid crystal panel 102. The photoluminescent structure 120 may have any suitable configuration or construction, and may be disposed in any suitable location optically between the liquid crystal panel 102 (or other light valve) and the excitation light source, wherein the term "optically between" signifies an intermediate location along an optical path. FIG. 3 shows an example of a suitable construction and location for the photoluminescent structure 120. In this embodiment, the photoluminescent structure 120 comprises a substrate 322 that is coupled to the back side 202 of the liquid crystal panel 102, and a photoluminescent layer 324 comprising one or more photoluminescent materials supported by the substrate 322. The depicted photoluminescent layer 324 is disposed immediately behind the liquid crystal panel 102, and therefore gives a user the impression of an active backlight at the same location.

The photoluminescent layer 324 may comprise any suitable photoluminescent materials, and may be constructed in any suitable fashion. For example, the photoluminescent layer 324 may comprise materials such as those that are utilized in fluorescent light bulbs. Alternatively the photoluminescent layer 324 may comprise any other suitable material or materials.

Both the substrate 322 and the photoluminescent layer 324 may be made from materials that are substantially transparent to the infrared wavelength or wavelengths at which objects on the display screen 106 are detected. Likewise, the substrate 322 may be made from a material that also is transparent to visible light so that light emitted by the photoluminescent layer 324 is not absorbed by the substrate 324.

Figure 4:
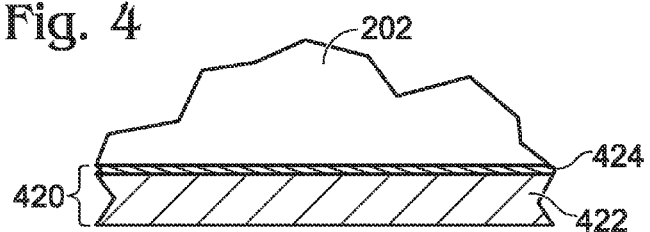
FIG. 4 shows a magnified view of another embodiment of a photoluminescent structure.

FIG. 4 shows another embodiment of a photoluminescent structure generally at 420. Like the embodiment of FIG. 3, photoluminescent structure 420 comprises a substrate 422 and a photoluminescent layer 424 supported by the substrate 422. However, unlike the embodiment of FIG. 3, the photoluminescent structure is sandwiched between the substrate 422 and the liquid crystal panel backside 202. In yet other embodiments (not shown), the photoluminescent structure may be sandwiched between two substrates, may be formed directly on the liquid crystal panel backside 202, or may have any other suitable configuration.

Figure 5:
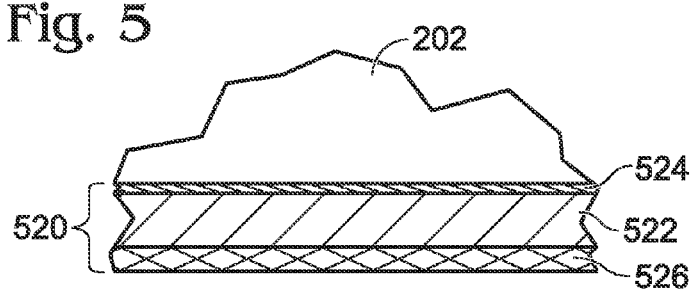
FIG. 5 shows a magnified view of another embodiment of a photoluminescent structure that comprises a visible light barrier.

In addition to the substrate and photoluminescent layer, a photoluminescent structure may comprise various other layers or structures. For example, FIG. 5 shows a photoluminescent structure 520 comprising a substrate 522, a photoluminescent layer 524, and a visible light barrier 526. The visible light barrier 526 includes a visible light-blocking or reflecting mirror or filter located below the photoluminescent structure 520, and helps to prevent a user from seeing the image sensor or other internal structures of the interactive display device 100. Any suitable material or material may be used to form the visible light barrier 526. For example, in one embodiment, the visible light barrier 526 comprises a multi-layer dielectric reflector formed from alternating layers of a high refractive index material and a low refractive index material. The thicknesses of the layers may be selected to tailor the reflectivity and transmissivity of the reflector to desired visible and infrared wavelengths, respectively. In other embodiments, the reflector may comprise a metallic layer or other visibly reflective layer.

While FIG. 5 depicts the visible light barrier 526 as an additional layer added to the structure of the embodiment of FIG. 4, it will be understood that the visible light barrier also may be used in conjunction with the embodiment of FIG. 3. Referring briefly back to FIG. 3, in such an embodiment, the photoluminescent layer 324, for example, may be sandwiched between the substrate 322 and a visible light barrier (not shown in FIG. 3). Further, it will be appreciated that the visible light barrier may be disposed at any other suitable location between a photoluminescent layer and structures that are to be hidden from the view of a user, and may be provided either as an integral part of the liquid crystal panel 102, or as a separate structure.

Figure 6:
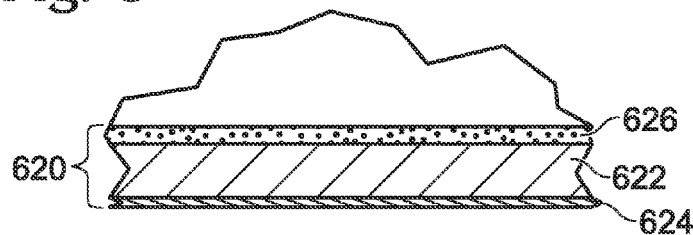
FIG. 6 shows a magnified view of another embodiment of a photoluminescent structure that comprises an ultraviolet light barrier.

Continuing with the Figures, FIG. 6 depicts an embodiment of a photoluminescent structure 620 that comprises a substrate 622, a photoluminescent layer 624, and an ultraviolet light barrier 626. The ultraviolet light barrier 626 is disposed between the photoluminescent layer 624 and a user of the interactive display system 100. This may help to prevent any ultraviolet light that is not absorbed by the photoluminescent layer 624 from passing through the display screen 106 and reaching a user.

Any suitable ultraviolet-absorbing material or materials may be used as ultraviolet light barrier 626. Suitable materials include, but are not limited to, materials that are substantially transparent to visible light and to one or more wavelengths of infrared light used to detect objects located on the display screen 106. Such materials help to insure that the ultraviolet light barrier 626 does not absorb visible light emitted by the photoluminescent layer 626 and infrared light emitted by the illuminant 116 to a detrimental degree.

While the ultraviolet light barrier of FIG. 6 is depicted as an additional layer that is added to the embodiment of FIG. 3, it will be understood that an ultraviolet light barrier may be used with any of the embodiments depicted herein, as well as with any other photoluminescent structure. Additionally, while the ultraviolet light barrier of FIG. 6 is depicted as being a part of the depicted photoluminescent structure 620, it will be understood that an ultraviolet light barrier may be located at any other suitable position between a photoluminescent layer and a user, including but not limited to locations on an opposite side of the liquid crystal panel 102 as the photoluminescent structure.

Figure 7:
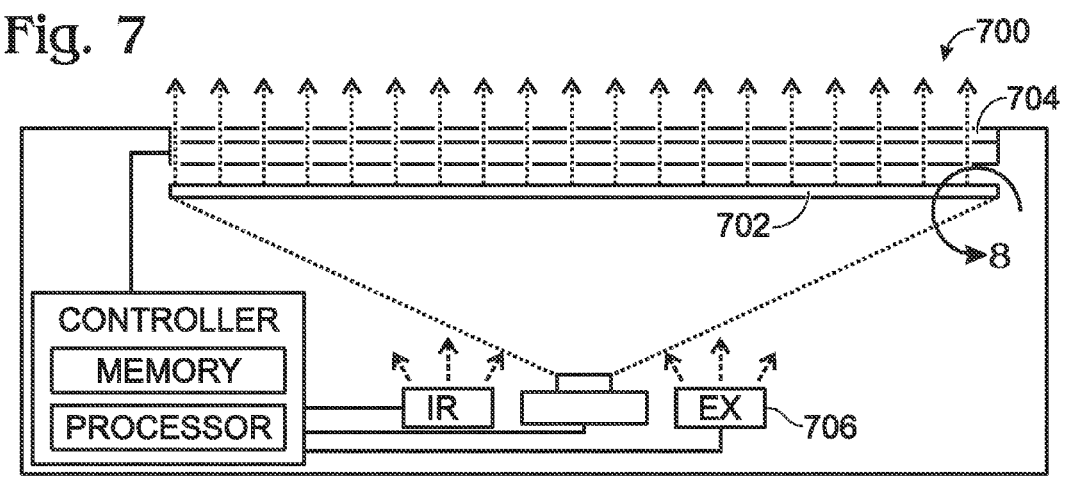
FIG. 7 shows another embodiment of an interactive display device backlit via a photoluminescent material.

In the embodiments of FIGS. 1-6, the photoluminescent structures are shown as being directly coupled to the liquid crystal panel 102 in that the photoluminescent structures are supported by the back side 202 of the liquid crystal panel 102. In other embodiments, the photoluminescent structure may be spaced from the liquid crystal panel 102 such that the photoluminescent structure is not directly supported by the back side 202 of the liquid crystal display panel. FIG. 7 shows one embodiment of an interactive display device 700 having a photoluminescent structure 702 spaced from a display screen 704. The photoluminescent structure 702 may be disposed in any suitable location between the display screen 704 and the excitation light source 706. Suitable locations include locations at which light from the photoluminescent structure 702 is not blocked by other structures within the interactive display device 700 before reaching the liquid crystal panel, and/or at which the photoluminescent structure 702 is effective in hiding other structures within the interactive display device 700 from the view of users.

Figure 8:
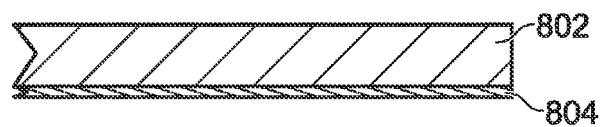
FIG. 8 shows a magnified view of an embodiment of a photoluminescent structure of the embodiment of FIG. 7.

FIG. 8 shows one embodiment of the photoluminescent structure 702 in more detail. As depicted, the photoluminescent structure 702 comprises a substrate 802, and a photoluminescent layer 804 supported by the substrate. In the depicted embodiment, the photoluminescent layer 804 is depicted as being disposed on a side of the substrate opposite the display screen 704. However, it will be understood that the photoluminescent layer 804 also may be disposed on a side of the substrate facing the display screen 704, or in any other suitable configuration (for example, sandwiched between two substrates, between the substrate and another layer, etc.).

The photoluminescent structure 702 may comprise any other suitable layers or structures than those shown. For example, the photoluminescent structure 702 may comprise an ultraviolet light barrier, such as that described above with reference to FIG. 6, disposed on an opposite side of the photoluminescent layer 804 as the excitation light source 706. Likewise, the photoluminescent structure 702 may comprise a visible light barrier, such as that described above with reference to FIG. 5, disposed between the photoluminescent layer 804 and the excitation light source 706.

FIG. 9 shows an embodiment of a method 900 for backlighting a light valve. Method 900 first comprises, at 902, emitting light from an excitation light source, and then at 904, exposing a photoluminescent material located between the excitation light source and the light valve to light from the excitation light source. Then, at 906, method 900 comprises emitting light via photoluminescence from the photoluminescent material through light valve, thereby backlighting the light valve. Method 900 also comprises, at 908, emitting infrared light and passing infrared light through the photoluminescent material, and at 910, detecting infrared light reflected from an object located on the opposite side of the light valve as the photoluminescent material. In this manner, the photoluminescent material gives the impression that a backlight is located immediately behind the light valve, yet does not interfere with the detection of objects via infrared light transmitted through the light valve.

Method 900 further may include various other optional steps, such as those shown in dashed lines in FIG. 9. For example, method 900 may comprise, at 912, preventing any ultraviolet light that passes through the photoluminescent material without being absorbed by the photoluminescent material from reaching a user. This may be performed, for example, via an ultraviolet light barrier, as described above.

Method 900 also may include blocking any ambient visible light that passes through the photoluminescent material from reflecting off of other internal device structures so that the structures are not visible to a user. This may be performed, for example, via a visible light barrier, as described above. It will be understood that method 900 may be used with any suitable light valve, including but not limited to liquid crystal panels.

Any suitable wavelength/color of light may be emitted via the photoluminescent material. For example, in one embodiment, a mixture of a plurality of photoluminescent materials may be used such that the various colors of light emitted by the photoluminescent material combine to form light that is white in appearance. In other embodiments, the photoluminescent material may be configured to emit light having a desired non-white appearance.

FIG. 10 shows another embodiment of a photoluminescent structure 1000 disposed adjacent to a liquid crystal panel 1002. The photoluminescent structure 1000 comprises photoluminescent particles, indicated schematically at 1004, suspended in a sheet-like matrix 1006 that is configured to pass visible and infrared light. It will be understood that the matrix 1006 may have any suitable thickness, and the individual photoluminescent particles 1004 may have any suitable size and may be included in the matrix 1006 at any suitable concentration.

The photoluminescent structure 1000 is illuminated by an excitation light source 1008 positioned at a side edge 1010 of the photoluminescent structure 1000. The light source 1008 may comprise a light-emitting diode, a tube, or any other suitable device. Light emitted by the excitation light source 1008 travels along the photoluminescent structure 1000 via internal reflection until the light encounters a photoluminescent particle 1004. Upon encountering a photoluminescent particle 1004, the light is absorbed, thereby exciting the absorbing species and resulting in the emission of light from the photoluminescent particle 1004. A portion of the light emitted in this manner will be at angles that do not internally reflect within the photoluminescent structure 1000 and that cause the emitted light to pass through the liquid crystal panel 1002. In this manner, the light source 1008 positioned at the side edge of the photoluminescent structure may be used to excite photoluminescent particles disposed along the entire volume of the matrix 1006 and backlight the entire liquid crystal panel 1002.

It will be understood that various display and photoluminescent structure embodiments may have additional layers or structures not disclosed herein without departing from the scope of the present disclosure. It will also be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
    a light valve comprising a liquid crystal display having a viewing side and a back side;
    an image sensor disposed behind the back side of the light valve;
    an infrared illuminant disposed behind the back side of the light valve;
    a photoluminescent material disposed at a location between the image sensor and the light valve;
    a visible light barrier disposed between the photoluminescent material and the image sensor, wherein the visible light barrier is transmissive to wavelengths of infrared light emitted by the infrared illuminant; and
    an excitation light source positioned to illuminate the photoluminescent material.

2. The computing device of claim 1, wherein the photoluminescent material is supported by the back side of the light valve.

3. The computing device of claim 2, wherein the photoluminescent material is disposed on a transparent substrate coupled to the back side of the light valve.

4. The computing device of claim 1, wherein the photoluminescent material is substantially transparent to one or more infrared wavelengths.

5. The computing device of claim 1, wherein the light valve comprises a liquid crystal panel.

6. The computing device of claim 1, wherein the excitation light source comprises one or more of a tube, a laser, and a light-emitting diode.

7. The computing device of claim 1, further comprising an ultraviolet light barrier configured to block ultraviolet light not absorbed by the photoluminescent material.

8. The computing device of claim 1, further comprising a plurality of photoluminescent materials configured to emit light of different colors.

9. The computing device of claim 1, wherein the infrared illuminant comprises an infrared diode.

10. A liquid crystal panel, comprising:
    a viewing side configured to face toward a viewer of the liquid crystal display panel;
    a back side disposed opposite the viewing side;
    a liquid crystal layer located between the viewing side and the back side;
    a layer of a photoluminescent material supported by the back side; and
    a visible light barrier supported by the back side of the liquid crystal display panel such that the layer of the photoluminescent material is located between the visible light barrier and the liquid crystal layer, and wherein the visible light barrier is configured to transmit one or more infrared wavelengths while substantially reflecting or absorbing visible wavelengths.

11. The liquid crystal panel of claim 10, wherein the layer of the photoluminescent material is disposed on a substrate supported by the back side.

12. The liquid crystal panel of claim 10, wherein the photoluminescent material is substantially transparent to one or more infrared wavelengths.

13. The liquid crystal panel of claim 10, further comprising an ultraviolet light barrier disposed between the photoluminescent material and the front side.

14. The liquid crystal panel of claim 10, further comprising a plurality of photoluminescent materials configured to emit light of different colors that produce white light when combined.

15. A method of operating a computing device comprising a light valve, the method comprising:
    emitting light from an excitation light source;
    exposing a photoluminescent structure located optically between the excitation light source and the light valve to light from the excitation light source;
    emitting visible light via photoluminescence from the photoluminescent structure through the light valve, wherein at least a portion of the visible light is reflected by a visible light barrier before being emitted through the light valve;

while emitting the visible light from the photoluminescent structure through the light valve, emitting infrared light from an infrared illuminant through the visible light barrier, the photoluminescent structure, and the light valve;

receiving reflected infrared light from the infrared illuminant that is reflected via an object;

passing the reflected infrared light through the light valve, the photoluminescent structure, and the visible light barrier; and detecting the reflected infrared light via an image sensor.

16. The method of claim 15, wherein emitting light via photoluminescence comprises emitting light of a plurality of colors that combine to form white light.

17. The method of claim 15, further comprising preventing any ultraviolet light that passes through the photoluminescent structure from reaching a user via an ultraviolet light barrier.

* * * * *